(12) United States Patent
Ma et al.

(10) Patent No.: US 12,480,931 B2
(45) Date of Patent: Nov. 25, 2025

(54) METHOD FOR QUICKLY ACQUIRING SOIL HYDRAULIC PROPERTIES IN SITU BASED ON PONDED INFILTRATION EXPERIMENT

(71) Applicant: Institute of Soil Science, Chinese Academy of Sciences, Nanjing (CN)

(72) Inventors: Donghao Ma, Nanjing (CN); Sicong Wu, Nanjing (CN); Jiabao Zhang, Nanjing (CN); Lianghong Chen, Nanjing (CN)

(73) Assignee: Institute of Soil Science, Chinese Academy of Sciences, Nanjing (CN)

( * ) Notice: Subject to any disclaimer, the term of this patent is extended or adjusted under 35 U.S.C. 154(b) by 230 days.

(21) Appl. No.: 18/242,011

(22) Filed: Sep. 5, 2023

(65) Prior Publication Data

US 2024/0183838 A1    Jun. 6, 2024

(30) Foreign Application Priority Data

Nov. 28, 2022    (CN) .......................... 202211501243.4

(51) Int. Cl.
*G01N 33/24*    (2006.01)

(52) U.S. Cl.
CPC ......... *G01N 33/246* (2013.01); *G01N 33/245* (2024.05)

(58) Field of Classification Search
CPC ............................ G01N 33/245; G01N 33/246
See application file for complete search history.

(56) References Cited

PUBLICATIONS

Guellouz et al. "Estimation of the soil hydraulic properties from field data by solving an inverse problem" Scientific Reports (2020) 10:9359, 11 pages.*
Liu et al. "Predicted Infiltration for Sodic/Saline Soils from Reclaimed Coastal Areas: Sensitivity to Model Parameters" The Scientific World Journal (2014) article 317870, 12 pages.*
Mahapatra et al. "Assessing Variability of Infiltration Characteristics and Reliability of Infiltration Models in a Tropical Sub-humid Region of India" Scientific Reports (2020) 10:1515, 18 pages.*

* cited by examiner

*Primary Examiner* — Nathaniel J Kolb
(74) *Attorney, Agent, or Firm* — Bayramoglu Law Offices LLC (57) ABSTRACT

A method for quickly acquiring soil hydraulic properties in situ based on a ponded infiltration experiment is provided. The method adopts a novel derivation method, and is based on a Richards' equation and a Brooks-Corey model to derive an analytical solution that accurately describes one-dimensional infiltration into homogeneous soil under ponded conditions. The method, for the first time, provides a detailed description of a developing saturated zone in the soil water profile, which is the most vital infiltration characteristic during ponded infiltration. The method proposes an optimized estimation method for parameters based on an inverse process of the analytical solution. The method can quickly acquire soil hydraulic properties in situ field by measuring a cumulative infiltration amount and a length of a wetting front over time during one-dimensional ponded infiltration experiment through a time-domain reflectometer (TDR).

4 Claims, 4 Drawing Sheets

The $\theta_i$ is measured by TDR, and then the in situ field one-dimensional ponded infiltration experiment is performed with ponding depth $h_p$.

During infiltration, the time series data of cumulation infiltration amount ($I$-$t$) and wetting front length ($z_f$-$t$) are acquired in real-time by interpreting a waveform of the TDR.

At the end of infiltration, the $\theta_s$ is measured by TDR, and then the undisturbed soil sample is taken with a cutting ring and placed in a pressure membrane meter to measure $\theta_r$.

With known $\theta_s$, $\theta_i$, $\theta_r$, and time series data $I$-$t$ and $z_f$-$t$, the soil hydraulic properties ($n$, $h_d$, and $K_s$) are optimized by minimizing objective function $Q$: $Q = \sum \left( \hat{I}_i(n, h_d, K_s) - I_i \right)^2 + \sum \left( \hat{z}_{f,i}(n, h_d, K_s) - z_{f,i} \right)^2$

METHOD FOR QUICKLY ACQUIRING SOIL HYDRAULIC PROPERTIES IN SITU BASED ON PONDED INFILTRATION EXPERIMENT

CROSS REFERENCE TO THE RELATED APPLICATIONS

This application is based upon and claims priority to Chinese Patent Application No. 202211501243.4, filed on Nov. 28, 2022, the entire contents of which are incorporated herein by reference.

TECHNICAL FIELD

The present disclosure relates to a method for quickly acquiring soil hydraulic properties in situ based on a ponded infiltration experiment, and belongs to the technical field of farmland water conservancy and soil hydrology measurement.

BACKGROUND

Soil hydraulic properties (soil water retention curve and saturated/unsaturated hydraulic conductivity) are basic input parameters for simulating soil water movement in a vadose zone. Due to the relatively large spatial-temporal variability of soil hydraulic properties, determining representative and accurate values over a region or watershed is a huge and time-consuming task. Therefore, developing a simple, low-cost, and time-saving method is crucial for acquiring the soil hydraulic properties of a region or watershed.

Direct methods for acquiring soil hydraulic properties rely on a cutting ring to take a soil sample for laboratory analysis. They require expensive equipment (e.g., a sandbox, a suction plate, a pressure membrane, and a centrifuge) to obtain a soil water retention curve through a slow drainage process. A saturated hydraulic conductivity is measured with a constant-head or variable-head method. The main limitations of direct methods are that they are time-consuming, labor-intensive, and costly. Indirect methods based on monitoring a vertical or horizontal infiltration process and inverse modeling can acquire soil hydraulic properties quickly and simply. However, numerical inversions to Richards' equation remain problems of non-convergence and non-uniqueness. Inversions based on approximate solutions to Richards' equation can overcome the problems of numerical calculation and is currently the most promising development direction. At present, there are many analytical solutions to the infiltration problem, but their accuracy is not enough to meet the requirement of inverse predictions of soil hydraulic properties. An important reason is that the current infiltration formula does not consider the important characteristic that a developing saturated zone in soil water profile under ponded conditions. In addition, soil structure is particularly important for soil hydraulic properties. However, in the above methods, the undisturbed soil sample taken with a cutting ring needs to be brought to a laboratory for measurement. During the sampling and transportation process, it is inevitable to damage the structure of the undisturbed soil sample, resulting in distorted measurement results. Therefore, there is an urgent need for a method that can be directly used in situ field to quickly acquire the soil hydraulic properties.

SUMMARY

In order to overcome the defects in the prior art, an objective of the present disclosure is to provide a method for quickly acquiring soil hydraulic properties in situ based on a one-dimensional ponded infiltration experiment.

The present disclosure adopts the following technical solution.

The method for quickly acquiring soil hydraulic properties in situ based on a one-dimensional ponded infiltration experiment includes the following steps:

(1) measuring a saturated water content $\theta_s$, an initial water content $\theta_i$, and a residual water content $\theta_r$ of soil;

(2) monitoring variations of a cumulative infiltration amount I and a length $z_f$ of a wetting front over an infiltration time t during an in-situ field one-dimensional ponded infiltration experiment; and (3) calculating target parameters n, $h_d$, and $K_s$ with an optimized calculation method according to an objective function (9):

$$\min Q = \sum_{i=1}^{N}(\hat{I}_i(n, h_d, K_s) - I_i)^2 + \sum_{i=1}^{N}(\hat{z}_{f,i}(n, h_d, K_s) - z_{f,i})^2 \qquad (9)$$

where, $I_i$ and $\hat{I}_i$ respectively denote an observed value of the cumulative infiltration amount and a predicted value of the cumulative infiltration amount calculated by an analytical model; $z_{f,i}$ and $\hat{z}_{f,i}$ respectively denote an observed value of the length of the wetting front and a predicted value of length of the wetting front calculated by the analytical model; and N denotes a total number of observed values.

Preferably, step (3) further includes: optimizing the objective function (9) through a Levenberg-Marquardt algorithm, with the idea of estimating correct values of the target parameters (n, $h_d$, and $K_s$) to minimize the value of objective function (9); and calculating estimated values $\hat{I}(n, h_d, K_s)$ and $\hat{z}_f(n, h_d, K_s)$ as follows:

calculating, by a Newton-Simpson method, an estimated value $\hat{z}_s(n_e, h_{d,e}, K_{s,e})$ of a length $z_s$ of a saturated zone at any infiltration time t, given a set of estimation parameters $n_e$, $h_{d,e}$, and $K_{s,e}$, according to Equation (5):

$$z_s - (B_3 + B_5)\ln\left(1 + \frac{z_s}{B_3}\right) + \\ B_5 \ln\left(1 + \frac{B_2 z_s}{B_3}\right) + \frac{B_1}{(1-B_2)B_2}\left(1 - \frac{B_3}{(B_2 z_s + B_3)}\right) = B_4 t \qquad (5)$$

calculating, based on the estimated value $\hat{z}_s(n_e, h_{d,e}, K_{s,e})$, an estimated value $\hat{I}(n_e, h_{d,e}, K_{s,e})$ of the cumulative infiltration amount I according to Equation (6):

$$I = (\theta_s - \theta_i)\left(z_s + \frac{b_1 z_s}{B_2 z_s + B_3}\right) + K_i t \qquad (6)$$

calculating an estimated value $\hat{z}_f(n_e, h_{d,e}, K_{s,e})$ of the length $z_f$ of the wetting front according to Equation (7):

$$z_f = z_s + \frac{B_1 z_s}{B_0(B_2 z_s + B_3)} \qquad (7)$$

where, unknown parameters in the above equations are defined as follows:

$$\begin{cases} S_i = \dfrac{\theta_i - \theta_r}{\theta_s - \theta_r} \\ a = \dfrac{n}{2n+2} \\ b = 1 - S_i^{\frac{1}{a}} \\ B_0 = (\theta_s - \theta_r)\dfrac{1-(1+ab)S_i}{b(a+1)} \\ B_1 = \dfrac{1 - S_i^{1+1/n}}{3n+1} \\ B_2 = 1 - \dfrac{(a+1)(1-S_i) - (a(a+2)b - (1-b)(1-S_i))S_i^{3+2/n}}{(1-(1+ab)S_i)(a+2)} \\ B_3 = h_p + h_d \\ B_4 = \dfrac{K_s}{\theta_s - \theta_i} \\ B_5 = \dfrac{B_1}{(1-B_2)^2} \end{cases} \quad (8)$$

Preferably, steps (1) and (2) specifically include a parameter acquisition method as follows:

inserting, before infiltration, a probe of a time-domain reflectometer (TDR) into target soil for one-dimensional ponded infiltration experiment with a ponded depth of $h_p$, starting acquiring a time-domain reflection signal from the probe of the TDR before infiltration; calculating the initial water content $\theta_i$ and the saturated water content $\theta_s$ of the soil; sampling the soil with a cutting ring; and measuring the residual water content $\theta_r$ of the soil through a weighing method by conducting a laboratory drainage experiment at 15 bar with a pressure membrane, where the residual water content $\theta_r$ is only determined by a soil texture, allowing for in-situ destructive sampling after infiltration; and acquiring time series data $z_f$-t of a length of wetting front and time series data I-t of the cumulative infiltration amount in real-time by interpreting a waveform of the TDR during one-dimensional ponded infiltration.

Preferably, steps (1) and (2) specifically further include a parameter acquisition method as follows:

(A) inserting, before infiltration, the probe of the TDR with a length of L vertically and wholly into the target soil until the head of the probe is flush with the soil surface; acquiring, by the TDR, a reflection signal from the probe of the TDR continuously at a predetermined frequency during infiltration, until a length of wetting front exceeds the length of the probe and a soil layer monitored by probe of the TDR reaches a saturated state;

(B) determining that there is no wetting front within a measurement range of the TDR before and at the end of infiltration; extracting apparent positions of the head and a tail of the probe before infiltration from the reflection waveform of the TDR, and acquiring an initial apparent length $L_{ad}$ of a soil layer monitored by the probe of the TDR; extracting apparent positions of the head and the tail of the probe at the end of infiltration, and acquiring a saturated apparent length $L_{as}$ of the soil layer monitored by the probe of the TDR; calculating, based on an electromagnetic wave transmission theory, an initial average dielectric constant $K_{ad}=(L_{ad}/L)^2$ and a saturated average dielectric constant $K_{as}=(L_{as}/L)^2$ of the monitored soil layer; and converting, based on a relationship between a soil water content and a dielectric constant $K_{ad}$ and $K_{as}$, into the initial water content $\theta_i$ and the saturated water content $\theta_s$ of the soil, respectively; and (C) determining that there is a wetting front within the measurement range of the TDR after infiltration begins; extracting, at each moment, an apparent length $L_a$ of the soil layer monitored by the probe of the TDR and an apparent length $L_{aw}$ of the wetting front from the reflection waveform of the TDR before the wetting front reaches the tail of the probe; calculating an average dielectric constant $K_a=(L_a/L)^2$ of the monitored soil layer based on the apparent length $L_a$; converting, based on the relationship between the soil water content and the dielectric constant, the average dielectric constant $K_a$ of the soil layer monitored by the probe of the TDR into a real-time average water content $\theta$; calculating the cumulative infiltration amount of the soil, $I=L*(\theta-\theta_i)$; acquiring the time series data I-t of the cumulative infiltration amount and the length of the wetting front, $z_i=L*(L_{ad}-L_a+L_{aw})/L_{ad}$; and acquiring the time series data $z_f$-t of the length of the wetting front.

Preferably, step (C) further includes: extracting, by a second-derivative method, the apparent positions of the wetting front and the tail of the probe in the waveform of the TDR: acquiring first-derivative and second-derivative of waveform data; determining a first zero point of the first-derivative of the waveform data after the occurrence of a maximum value of the first-derivative as an apparent position $X_h$ corresponding to the head of the probe of the TDR; determining positions where the second and third local maximum values of the second-derivative of waveform data appear after $X_h$ as an apparent position $X_f$ corresponding to the wetting front and an apparent position $X_e$ corresponding to the tail of the probe of the TDR, respectively; determining the apparent length $L_a$ of the monitored soil layer as a distance $X_e$–$X_h$ between the apparent positions of the head and the tail of the probe; and determining the apparent length $L_{aw}$ of the wetting front as a distance $X_f$–$X_h$ between the apparent positions of the head and the tail of the probe.

The present disclosure has the following beneficial effects:

Compared with the prior art, the present disclosure adopts a novel derivation method, and derives the analytical solution to the one-dimensional infiltration problem of homogeneous soil under ponded conditions based on a Richards' equation and a Brooks-Corey model. The present disclosure, for the first time, provides a detailed description of a developing saturated zone in soil water profile, which is the most vital infiltration characteristic during ponded infiltration. The present disclosure develops a method for acquiring soil hydraulic properties through a reverse process of the analytical solution. The present disclosure combines the TDR technology. Thus, the present disclosure can acquire the variation data of the cumulative infiltration amount and the length of the wetting front over time and acquire complete soil hydraulic properties only by recording the reflection waveform information in real-time through the TDR in the field in-situ infiltration experiment. The present disclosure provides a parameter inversion process featuring stability and low computational cost, avoiding problems such as non-uniqueness and non-convergence. Therefore, the present disclosure provides a powerful means for efficiently acquiring soil hydraulic properties required for the model simulation of a hydrogeochemical cycle process of a watershed or region.

DETAILED DESCRIPTION OF THE EMBODIMENTS

Figure 1:
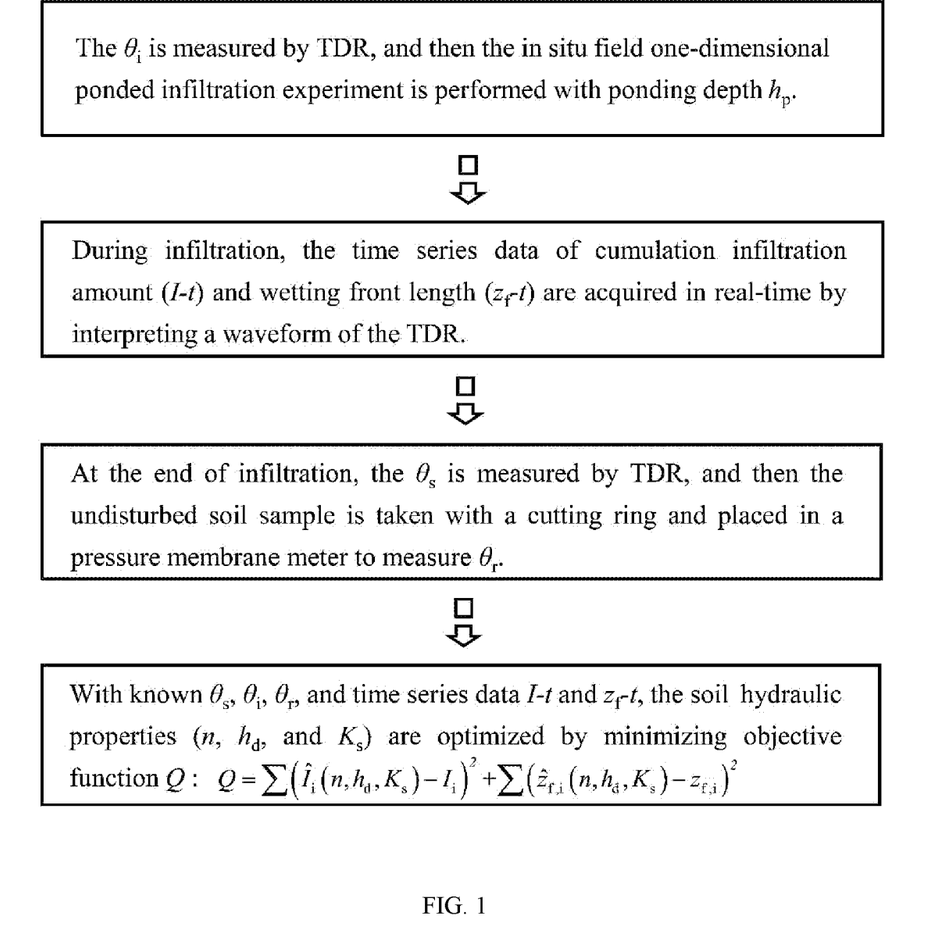
FIG. 1 is a flowchart of a method for quickly acquiring soil hydraulic properties in situ based on a one-dimensional ponded infiltration experiment according to the present disclosure.

The content of the present disclosure will be further described below in conjunction with the drawings, but they should not be construed as limiting the present disclosure. Modifications and substitutions made to methods, steps, or conditions of the present disclosure without departing from the spirit and essence of the present disclosure fall within the scope of the present disclosure. Unless otherwise specified, the technical means used in the embodiments are conventional means well known to those skilled in the art. FIG. 1 shows a calculation process according to the present disclosure.

Embodiment 1

The technical principles of the present disclosure are as follows. Based on a Richards' equation, a Brooks-Corey model, soil water flux-concentration relationship, and mean value theorem of integrals, the present disclosure acquires a profile equation describing water infiltration into soil. The present disclosure derives a complete analytical model for describing one-dimensional infiltration into homogeneous soil under ponded conditions based on the principle of mass conservation and the profile equation. Specifically:

The Richards' equation and its initial and boundary conditions are expressed as follows:

$$\begin{cases} \dfrac{\partial \theta}{\partial t} = \dfrac{\partial}{\partial z}\left[K(h)\dfrac{\partial h}{\partial z} + K(h)\right] \\ \theta(z, 0) = \theta_i \\ \theta(\infty, t) = \theta_i \\ h(0, t) = h_p \end{cases} \quad (1)$$

$\theta$ and $\theta_i$ respectively denote a soil water content and an initial soil water content ($cm^3\,cm^{-3}$); t denotes an infiltration time (min); z denotes a soil depth (cm); K denotes a soil hydraulic conductivity (cm $min^{-1}$); h denotes a soil matrix potential (cm); and $h_p$ denotes a ponding depth at the soil surface (cm).

The Brooks-Corey model describes the relationship between a soil unsaturated hydraulic conductivity, a soil matrix potential, and a soil water content as follows:

$$S = \dfrac{\theta - \theta_r}{\theta_s - \theta_r} = \begin{cases} \dfrac{\theta - \theta_r}{\theta_s - \theta_r} = \left|\dfrac{h_d}{h}\right|^n, & h \le -h_d \\ 1, & h > -h_d \end{cases} \quad (2)$$

$$K(h) = K_s\left|\dfrac{h_d}{h}\right|^m = K_s\left(\dfrac{\theta - \theta_r}{\theta_s - \theta_r}\right)^{\frac{m}{n}} \quad (3)$$

$\theta_s$ and $\theta_r$ respectively denote a saturated water content and a residual water content of the soil ($cm^3\,cm^{-3}$); $K_s$ denotes a saturated hydraulic conductivity of the soil (cm $min^{-1}$); n denotes a distribution index of a soil pore size; and $-h_d$ denotes a water-entry suction of the soil (cm), m=3n+2.

Equation (4) describes a variation relationship of effective soil water saturation S with soil depth z (cm) in a water profile of one-dimensional ponded infiltration. In Equation (4), $z_f$ denotes a length of a wetting front (cm); and $z_s$ denotes a length of a saturated zone (cm).

$$S = \dfrac{\theta - \theta_r}{\theta_s - \theta_r} = \begin{cases} \left(1 - b\dfrac{z - z_s}{z_f - z_s}\right)^a + \theta_r, & z \ge z_s \\ 1, & z < z_s \end{cases} \quad (4)$$

Equation (5) describes a quantitative relationship between the length $z_s$ of the saturated zone in the soil water profile and the infiltration time t (min) during ponded infiltration.

$$z_s - (B_3 + B_5)\ln\left(1 + \dfrac{z_s}{B_3}\right) + \\ B_5\ln\left(1 + \dfrac{B_2 z_s}{B_3}\right) + \dfrac{B_1}{(1 - B_2)B_2}\left(1 - \dfrac{B_3}{(B_2 z_s + B_3)}\right) = B_4 t \quad (5)$$

Equation (6) describes a quantitative relationship between the length $z_s$ (cm) of the saturated zone in the soil water profile and the length $z_f$ (cm) of the wetting front during ponded infiltration.

$$z_f = z_s + \dfrac{B_1 z_s}{B_0(B_2 z_s + B_3)} \quad (6)$$

Equation (7) describes a quantitative relationship between the length of the saturated zone $z_s$ (cm) in the soil water profile and cumulative infiltration amount I (cm) during the infiltration process.

$$I = (\theta_s - \theta_i)\left(z_s + \dfrac{b_1 z_s}{B_2 z_s + B_3}\right) + K_i t \quad (7)$$

where $K_i$ denotes a soil hydraulic conductivity at the initial water content (cm $min^{-1}$). The remaining unknown parameters are defined as follows.

$$\begin{cases} S_i = \dfrac{\theta_i - \theta_r}{\theta_s - \theta_r} \\ a = \dfrac{n}{2n + 2} \\ b = 1 - S_i^{\frac{1}{a}} \\ B_0 = (\theta_s - \theta_r)\dfrac{1 - (1 + ab)S_i}{b(a + 1)} \\ B_1 = \dfrac{1 - S_i^{1+1/n}}{3n + 1} \\ B_2 = 1 - \dfrac{(a + 1)(1 - S_i) - (a(a + 2)b - (1 - b)(1 - S_i))S_i^{3+2/n}}{(1 - (1 + ab)S_i)(a + 2)} \\ B_3 = h_p + h_d \\ B_4 = \dfrac{K_s}{\theta_s - \theta_i} \\ B_5 = \dfrac{B_1}{(1 - B_2)^2} \end{cases} \quad (8)$$

Through the above inverse process of the analytical model, an optimized calculation method for soil hydraulic properties (n, $h_d$, and $K_s$) is acquired. The method includes the following steps.

Step 1. Variations of cumulative infiltration amount I and length $z_f$ of a wetting front over infiltration time t during an in-situ field one-dimensional infiltration under ponded conditions of ponded depth $h_p$ are derived.

Step 2. Saturated water content $\theta_s$, initial water content $\theta_i$, and residual water content $\theta_r$ of soil are measured. Based on these parameters and datasets I-t and $z_f$-t, target parameters n, $h_d$, and $K_s$ are calculated with an optimized calculation method according to objective function (9).

$$\min Q = \sum_{i=1}^{N}(\hat{I}_i(n, h_d, K_s) - I_i)^2 + \sum_{i=1}^{N}(\hat{z}_{f,i}(n, h_d, K_s) - z_{f,i})^2 \quad (9)$$

$\hat{I}_i$ and $I_i$ respectively denote an observed value of the cumulative infiltration amount and a predicted value of the cumulative infiltration amount calculated by an analytical model; $\hat{z}_{f,i}$ and $z_{f,i}$ respectively denote an observed value of the length of the wetting front and a predicted value of length of the wetting front calculated by the analytical model; and N denotes a total number of observed values.

The objective function (9) is optimized through a Levenberg-Marquardt algorithm, with the idea of estimating correct values of the parameters (n, $h_d$, and $K_s$) to minimize the value of objective function (9). Estimated values $\hat{I}(n, h_d, K_s)$ and $\hat{z}_f(n, h_d, K_s)$ are calculated as follows. Given a set of estimation parameters ($n_e$, $h_{d,e}$, and $K_{s,e}$), an estimated value $\hat{z}_s(n_e, h_{d,e}, K_{s,e})$ of length $z_s$ of a saturated zone at any infiltration time t is calculated by a Newton-Simpson method according to Equation (5).

$$z_s - (B_3 + B_5)\ln\left(1 + \frac{z_s}{B_3}\right) + B_5\ln\left(1 + \frac{B_2 z_s}{B_3}\right) + \frac{B_1}{(1-B_2)B_2}\left(1 - \frac{B_3}{(B_2 z_s + B_3)}\right) = B_4 t \quad (5)$$

Based on the $\hat{z}_s(n_e, h_{d,e}, K_{s,e})$, estimated value $\hat{I}(n_e, h_{d,e}, K_{s,e})$ of the cumulative infiltration amount I is calculated according to Equation (7):

$$I = (\theta_s - \theta_i)\left(z_s + \frac{B_1 z_s}{B_2 z_s + B_3}\right) + K_i t \quad (7)$$

Estimated value $\hat{z}_f(n_e, h_{d,e}, K_{s,e})$ of the length $z_f$ of the wetting front is calculated according to Equation (6):

$$z_f = z_s + \frac{B_1 z_s}{B_0(B_2 z_s + B_3)} \quad (6)$$

The parameter definition is the same as above.

Embodiment 2

Step 1. Red soil was sampled from Yingtan, Jiangxi Province, China (28.202942°N, 116.948483°E, 20.9% sand, 34.9% silt, and 44.2% clay). The soil sample was air-dried, crushed, and passed through a 2 mm sieve. Then the soil was loaded into an organic glass column with an inner diameter of 19 cm and a length of 30 cm at a unit weight of 1.29 g cm$^{-3}$. Before an infiltration experiment began, a 30 cm long probe of a TDR was inserted into a soil surface to measure an initial water content of the soil, $\theta_i$=0.058 cm$^3$ cm$^{-3}$. Due to the low initial water content, a residual water content was temporarily assumed to be approximately the initial water content, that is, $\theta_r$=0.058 cm$^3$ cm$^{-3}$. In practical applications, if a more accurate residual water content is required, a soil sample is taken with a cutting ring within 0.5 m of a study area and is brought back to a laboratory to measure the residual water content with a pressure membrane.

Figure 2:
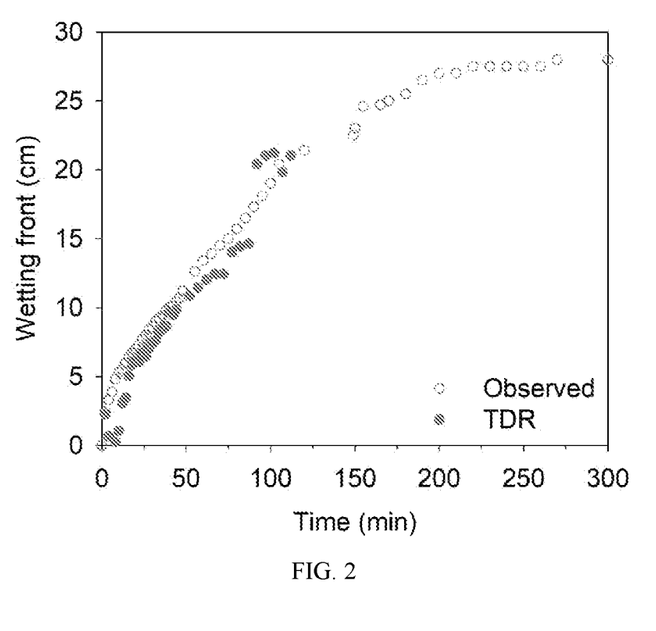
FIG. 2 shows a comparison between variations of a length of a wetting front observed by a TDR method and a conventional method.
Figure 3:
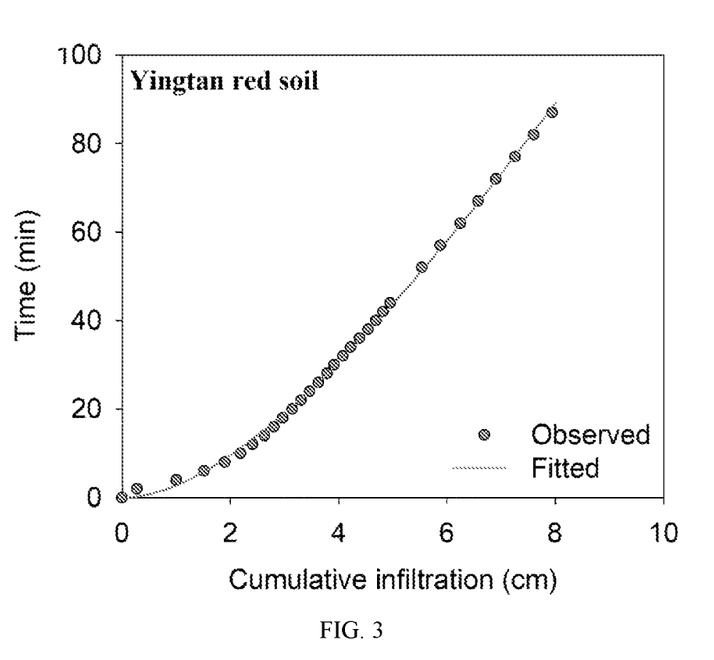
FIG. 3 shows a comparison between variations of a cumulative infiltration amount simulated by an analytical solution and observed in a test.

Step 2. Constant-pressure water was supplied through a commonly used Mariotte bottle in the industry to conduct a one-dimensional ponded infiltration experiment with a ponded depth of $h_p$=1 cm. An automatic water level monitoring and acquisition system was provided. During an ponded infiltration process, a real-time reflection waveform signal of the measured soil was acquired through the probe of the TDR. Data series I-t and $z_f$-f (observed values shown in FIGS. 2 and 3) of a cumulative infiltration amount and a length of a wetting front over time were acquired through waveform analysis. After the infiltration experiment was completed, the water supply was continued until the soil column was saturated. The saturated water content of the soil was measured through the probe of the TDR, $\theta_s$=0.513 cm$^3$ cm$^{-3}$.

Figure 4:
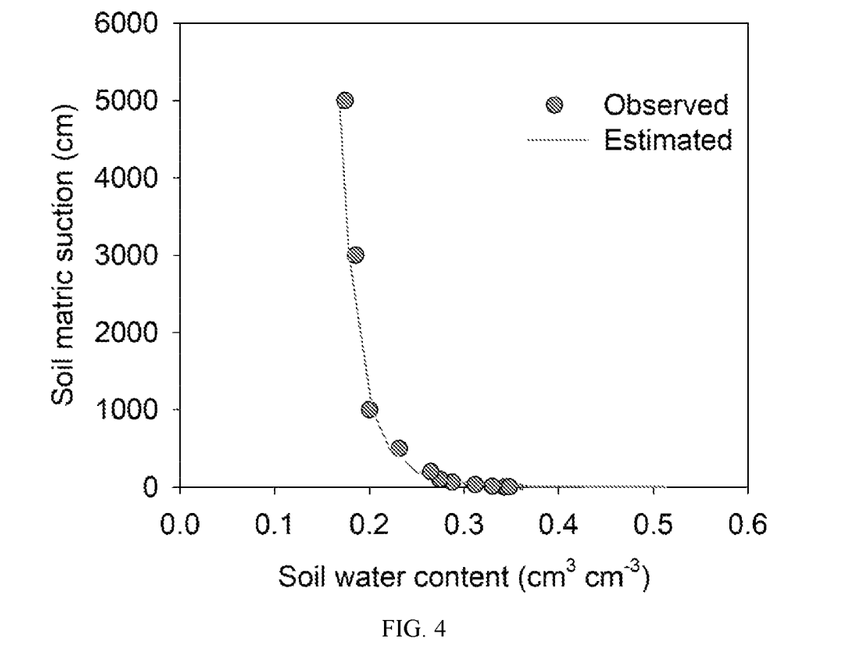
FIG. 4 shows a comparison between a soil water retention curve predicted by the method of the present disclosure and a measurement result of a pressure membrane method.

Step 3. Based on known parameters ($\theta_i$, $\theta_s$, $\theta_r$, and $h_p$) and the time series data I-t of the cumulative infiltration amount and the time series data $z_f$-t of the wetting front, a Levenberg-Marquardt algorithm was introduced to optimize Equation (9) to estimate parameters n, $h_d$, and $K_s$. The estimated results and the measured values acquired through the standard pressure membrane method and the constant-head method are shown in Table 1 and FIG. 4. It can be seen that the method for estimating the soil hydraulic parameters provided by the present disclosure is an accurate method.

TABLE 1

Comparison between estimated values, acquired by the present disclosure, and measured values of soil hydraulic parameters

|  | n | $h_d$ (cm) | $K_s$ (cm · min$^{-1}$) |
|---|---|---|---|
| Measured values | 0.17 | 1.2 | 0.079 |
| Estimated values | 0.1965 | 2.588 | 0.081 |

It should be noted that the above embodiments are only intended to explain, rather than to limit the technical solutions of the present disclosure. Although the present disclosure is described in detail with reference to embodiments, those skilled in the art should understand that modifications or equivalent substitutions may be made to the technical solutions of the present disclosure without departing from the spirit and scope of the technical solutions of the present disclosure, and such modifications or equivalent substitutions should be included within the scope of the claims of the present disclosure.

What is claimed is:

1. A method for quickly acquiring soil hydraulic properties in situ based on ponded infiltration experiment, comprising the following steps:

(1) measuring a saturated water content $\theta_s$, an initial water content $\theta_i$, and a residual water content $\theta_r$ of soil, by inserting, before infiltration, a probe of a time-domain reflectometer (TDR) into target soil for a one-dimensional ponded infiltration experiment with a ponded depth of $h_p$; starting acquiring a time-domain reflection signal from the probe of the TDR before infiltration; calculating the initial water content $\theta_i$ and the saturated water content $\theta_s$ of the soil; sampling the soil with a cutting ring; and measuring the residual water content $\theta_r$ of the soil;

(2) monitoring variations of a cumulative infiltration amount I and a length $z_f$ of a wetting front over an infiltration time t during an in situ field one-dimensional ponded infiltration experiment, by acquiring time series data $z_f$-t of the length of the wetting front and time series data I-t of the cumulative infiltration amount in real-time by interpreting a reflection waveform of the TDR during one-dimensional ponded infiltration; and (3) calculating target parameters n, $h_d$, and $K_s$ with an optimized calculation method according to an objective function (9):

$$\min Q = \sum_{i=1}^{N} (\hat{I}_i(n, h_d, K_s) - I_i)^2 + \sum_{i=1}^{N} (\hat{z}_{f,i}(n, h_d, K_s) - z_{f,i})^2 \quad (9)$$

wherein, $I_i$ and $\hat{I}_i$ respectively denote an observed value of the cumulative infiltration amount and a predicted value of the cumulative infiltration amount calculated by an analytical model; $z_{f,i}$ and $\hat{z}_{f,i}$ respectively denote an observed value of the length of the wetting front and a predicted value of the length of the wetting front calculated by the analytical model; and N denotes a total number of observed values.

2. The method for quickly acquiring soil hydraulic properties in situ based on ponded infiltration experiment according to claim 1, wherein step (3) further comprises: optimizing the objective function (9) through a Levenberg-Marquardt algorithm to estimate correct values of the target parameters n, $h_d$, and $K_s$ to minimize the objective function (9); and calculating estimated values $\hat{I}(n, h_d, K_s)$ and $\hat{z}_f(n, h_d, K_s)$ as follows:

calculating, by a Newton-Simpson method, an estimated value $\hat{z}_s(n_e, h_{d,e}, K_{s,e})$ of a length $z_s$ of a saturated zone at any infiltration time t, given a set of estimation parameters $n_e$, $h_{d,e}$, and $K_{s,e}$, according to Equation (5):

$$z_s - (B_3 + B_5)\ln\left(1 + \frac{z_s}{B_3}\right) + B_5 \ln\left(1 + \frac{B_2 z_s}{B_3}\right) + \frac{B_1}{(1-B_2)B_2}\left(1 - \frac{B_3}{(B_2 z_s + B_3)}\right) = B_4 t \quad (5)$$

calculating, based on the estimated value $\hat{z}_s(n_e, h_{d,e}, K_{s,e})$, an estimated value $\hat{I}(n_e, h_{d,e}, K_{s,e})$ of the cumulative infiltration amount I according to Equation (6):

$$I = (\theta_s - \theta_i)\left(z_s + \frac{b_1 z_s}{B_2 z_s + B_3}\right) + K_i t \quad (6)$$

calculating an estimated value $\hat{z}_f(n_e, h_{d,e}, K_{s,e})$ of the length $z_f$ of the wetting front according to Equation (7):

$$z_f = z_s + \frac{B_1 z_s}{B_0(B_2 z_s + B_3)} \quad (7)$$

wherein, unknown parameters in the above equations are defined as follows:

$$\begin{cases} S_i = \dfrac{\theta_i - \theta_r}{\theta_s - \theta_r} \\ a = \dfrac{n}{2n+2} \\ b = 1 - S_i^{\frac{1}{a}} \\ B_0 = (\theta_s - \theta_r)\dfrac{1 - (1+ab)S_i}{b(a+1)} \\ B_1 = \dfrac{1 - S_i^{1+1/n}}{3n+1} \\ B_2 = 1 - \dfrac{(a+1)(1-S_i) - (a(a+2)b - (1-b)(1-S_i))S_i^{3+2/n}}{(1-(1+ab)S_i)(a+2)} \\ B_3 = h_p + h_d \\ B_4 = \dfrac{K_s}{\theta_s - \theta_i} \\ B_5 = \dfrac{B_1}{(1-B_2)^2} \end{cases} \quad (8)$$

3. The method for quickly acquiring soil hydraulic properties in situ based on ponded infiltration experiment according to claim 1, wherein steps (1) and (2) further comprise a parameter acquisition method as follows:

(A) inserting, before infiltration, the probe of the TDR with a length of L vertically and wholly into the target soil until a head of the probe is flush with the soil surface; and acquiring, by the TDR, a reflection signal from the probe of the TDR continuously at a predetermined frequency before infiltration, until a wetting front exceeds the length of the probe and a soil layer monitored by probe of the TDR reaches a saturated state;

(B) determining that there is no wetting front within a measurement range of the TDR before and at an end of infiltration;

extracting apparent positions of the head and a tail of the probe before infiltration from the reflection waveform of the TDR, and acquiring an initial apparent length $L_{ad}$ of a soil layer monitored by the probe of the TDR;

extracting apparent positions of the head and the tail of the probe at the end of infiltration, and acquiring a saturated apparent length $L_{as}$ of the soil layer monitored by the probe of the TDR;

calculating, based on an electromagnetic wave transmission theory, an initial average dielectric constant $K_{ad} = (L_{ad}/L)^2$ and a saturated average dielectric constant $K_{as} = (L_{as}/L)^2$ of the monitored soil layer; and calculating the initial water content $\theta_i$ and the saturated water content $\theta_s$, based on a relationship between the soil water contents and the dielectric constants $K_{ad}$ and $K_{as}$, respectively; and (C) determining that there is a wetting front within the measurement range of the TDR after infiltration begins;

extracting, at each moment, an apparent length $L_a$ of the soil layer monitored by the probe of the TDR and an apparent length $L_{aw}$ of the wetting front from the reflection waveform of the TDR before the wetting front reaches the tail of the probe;

calculating an average dielectric constant $K_a = (L_a/L)^2$ of the monitored soil layer based on the apparent length $L_a$;

converting, based on the relationship between the soil water content and the dielectric constant, the average dielectric constant $K_a$ of the soil layer monitored by the probe of the TDR into a real-time average water content $\theta$;

calculating the cumulative infiltration amount of the soil, $I = L*(\theta - \theta_i)$;

acquiring the time series data I-t of the cumulative infiltration amount and the length of the wetting front, $z_f = L*(L_{ad} - L_a + L_{aw})/L_{ad}$; and acquiring the time series data $z_f$-t of the length of the wetting front.

4. The method for quickly acquiring soil hydraulic properties in situ based on ponded infiltration experiment according to claim 3, wherein step (C) further comprises: extracting, by a second-derivative method, apparent positions of the wetting front and the tail of the probe from the reflection waveform data of the TDR:

acquiring a first-derivative and a second-derivative of the waveform data determining a first zero point of the first-derivative of the waveform data after occurrence of a maximum value of the first-derivative as an apparent position $X_h$ corresponding to the head of the probe of the TDR;

determining positions where second and third local maximum values of the second-derivative appear after $X_h$ as an apparent position $X_f$ corresponding to the wetting front and an apparent position $X_e$ corresponding to the tail of the probe of the TDR, respectively;

determining the apparent length $L_a$ of the monitored soil layer as a distance $X_e - X_h$ between the apparent positions of the head and the tail of the probe; and determining the apparent length $L_{aw}$ of the wetting front as a distance $X_f - X_h$ between the apparent positions of the head and the tail of the probe.

* * * * *